United States Patent
Chen

(10) Patent No.: US 9,855,922 B2
(45) Date of Patent: Jan. 2, 2018

(54) AUTOMATIC INTEGRATED AUTOMOBILE WINDSHIELD WIPER LIFTING DEVICE

(71) Applicant: MANHOOD TECH CORP. LTD., Hualien County (TW)

(72) Inventor: Chang-Chia Chen, Hualien County (TW)

(73) Assignee: MANHOOD TECH CORP. LTD., Hualien County (TW)

(\*) Notice: Subject to any disclaimer, the term of this patent is extended or adjusted under 35 U.S.C. 154(b) by 55 days.

(21) Appl. No.: 15/086,038

(22) Filed: Mar. 30, 2016

(65) Prior Publication Data

US 2017/0136994 A1    May 18, 2017

(30) Foreign Application Priority Data

Nov. 17, 2015 (TW) .............................. 104218433 U

(51) Int. Cl.
   *B60S 1/34* (2006.01)
   *B60S 1/04* (2006.01)

(52) U.S. Cl.
   CPC ........... *B60S 1/3422* (2013.01); *B60S 1/0455* (2013.01)

(58) Field of Classification Search
   CPC ..... B60S 1/0455; B60S 1/3413; B60S 1/3422
   USPC ............................ 15/250.19, 250.16, 250.17
   See application file for complete search history.

(56) References Cited

U.S. PATENT DOCUMENTS 5,628,084 A * 5/1997 Chen ..................... B60S 1/0455
                                                    15/250.1
6,588,046 B1 * 7/2003 Lee ....................... B60S 1/0455
                                                    15/250.001

FOREIGN PATENT DOCUMENTS

JP          5-162616      *  6/1993

OTHER PUBLICATIONS

Machine translation of description portion of Japanese publication 5-162616, published Jun. 1993.*

* cited by examiner

*Primary Examiner* — Gary Graham
(74) *Attorney, Agent, or Firm* — Leong C. Lei

(57) ABSTRACT

An automatic integrated automobile windshield wiper lifting device includes a driver unit, which includes, in the interior thereof, a driving element and a power supply. The driving element has an end to which a first driving body is mounted. A control element is arranged at a predetermined location of the driver unit. A lifting unit is mounted at a predetermined location of the driver unit. The lifting unit has an end at which a support element is arranged. The lifting unit includes therein a second driving body. The support element is coupled to the second driving body. The first driving body and the second driving body mate each other. An activator is arranged at a predetermined location of the lifting unit.

10 Claims, 8 Drawing Sheets

AUTOMATIC INTEGRATED AUTOMOBILE WINDSHIELD WIPER LIFTING DEVICE

TECHNICAL FIELD OF THE INVENTION

The present invention relates generally to an automatic integrated automobile windshield wiper lifting device, and more particularly to an automatic lifting device that comprises a control element to control an operation of a driving element so as to control a lifting unit to lift up a support element for achieving easy use, saving power, automatically lifting a wiper, preventing a wiper blade from hardening, and preventing the wiper blade from deforming.

DESCRIPTION OF THE PRIOR ART

Weather changes from minute to minute. Riding a motorcycle or walking on a road may sometimes get wetted by rain in a raining season. Most people prefer driving as transportation in a rain. To keep eyesight from being interfered with by rain in driving a car, windshield wipers are commonly used to wipe rainwater of windshields in order to ensure driving safety.

The wiper is commonly mounted on a front windshield of a car with a wiper blade positioned against the front windshield in order to effectively wipe and remove rainwater off the windshield. However, the windshield wiper blade is made of a rubber material and is in tight contact with the front windshield, so that when irradiated with intense sun light, the windshield may get an extremely high temperature that often cause hardening of the wiper blade. When a driver activates the wiper, the hardened wiper blade often cause wide spreading of a blurred and obscure span of oily contamination on the front windshield. Thus, the windshield wiper must be replaced for example every one year. Even for the best quality automobiles, the windshield wiper must keep replaced regularly. Sometimes, the drivers may get lazy to do the replacement or may be reluctant to do the replacement by considering it an economic burden. Consequently, poor eyesight may result due to the hardening of a windshield wiper and as a result, traffic accident may be caused. Thus, the conventional windshield wiper is inconvenient in use and may, in a poor condition, jeopardize the users' lives.

To prevent the wiper blade from getting hardened, various wiper lifting devices have been proposed by different inventors to selectively lift a wiper blade off the windshield and thus separating the wiper blade from the windshield by a distance. This prevents high temperature resulting from intense sun light from making the wiper blade hardened and deformed.

Although the known wiper lifting devices provide an effect of preventing the wiper blade from getting hardened or deformed by high temperature, hand operations are needed in lifting up the wiper blade. It is common that the driver, after parking a car, forgets to operate the wiper lifting device to lift up the wiper. This makes it not possible to achieve the desired protection of the wiper blade against hardening and deforming.

In view of these problems, the present invention aims to provide an automatic integrated automobile windshield wiper lifting device, which provides various advantages, such as being easy to use, saving electrical power, automatic operation to lifting a wiper, and preventing the wiper from getting hardened and deformed and is effective in overcoming the drawbacks of the known devices and improving utilization thereof.

SUMMARY OF THE INVENTION

The present invention provides an automatic integrated automobile windshield wiper lifting device, which generally comprises a driver unit, which comprises, in interior thereof, a driving element and a power supply. The driving element has an end to which a first driving body is mounted. The driver unit comprises a control element arranged at a predetermined location thereof. The power supply is electrically connected to the driving element and the control element. The driver unit is connected to a lifting unit at a predetermined location thereof. The lifting unit has an end at which a support element is arranged. The lifting unit comprises a second driving body arranged therein. The support element is coupled to the second driving body. The first driving body and the second driving body re in mating engagement with each other to drive the support element. The lifting unit is provided, at a predetermined location, with an activator.

In the above-described driver unit, the control element is arranged at a location on one side, one end, or one surface of the driver unit.

In the above-described control element, the control element has a surface on which a switch, a sensing element, and a determination element are arranged.

In the above-described driver unit, the lifting unit is mounted at a location on one side, one end, or one surface of the driver unit.

In the above-described lifting unit, the lifting unit has a periphery on which the activator is arranged.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
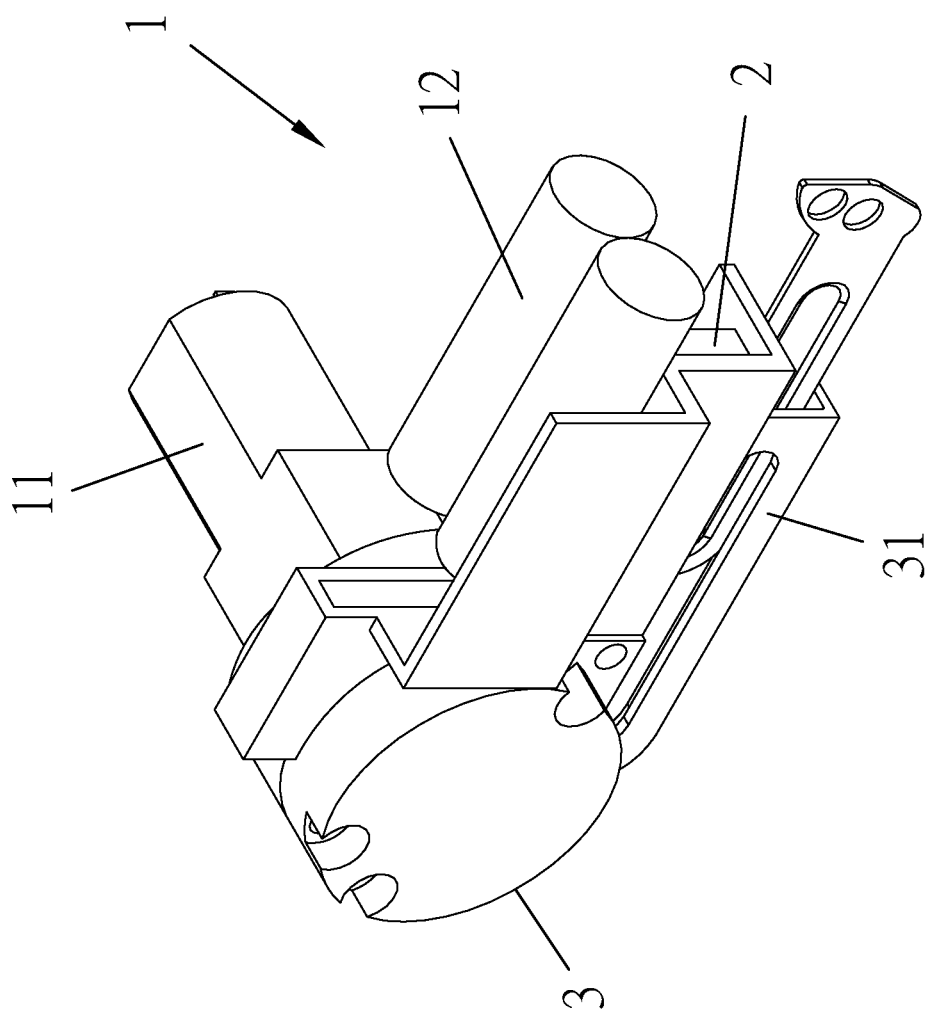
FIG. 1 is a perspective view of the present invention.
Figure 2:
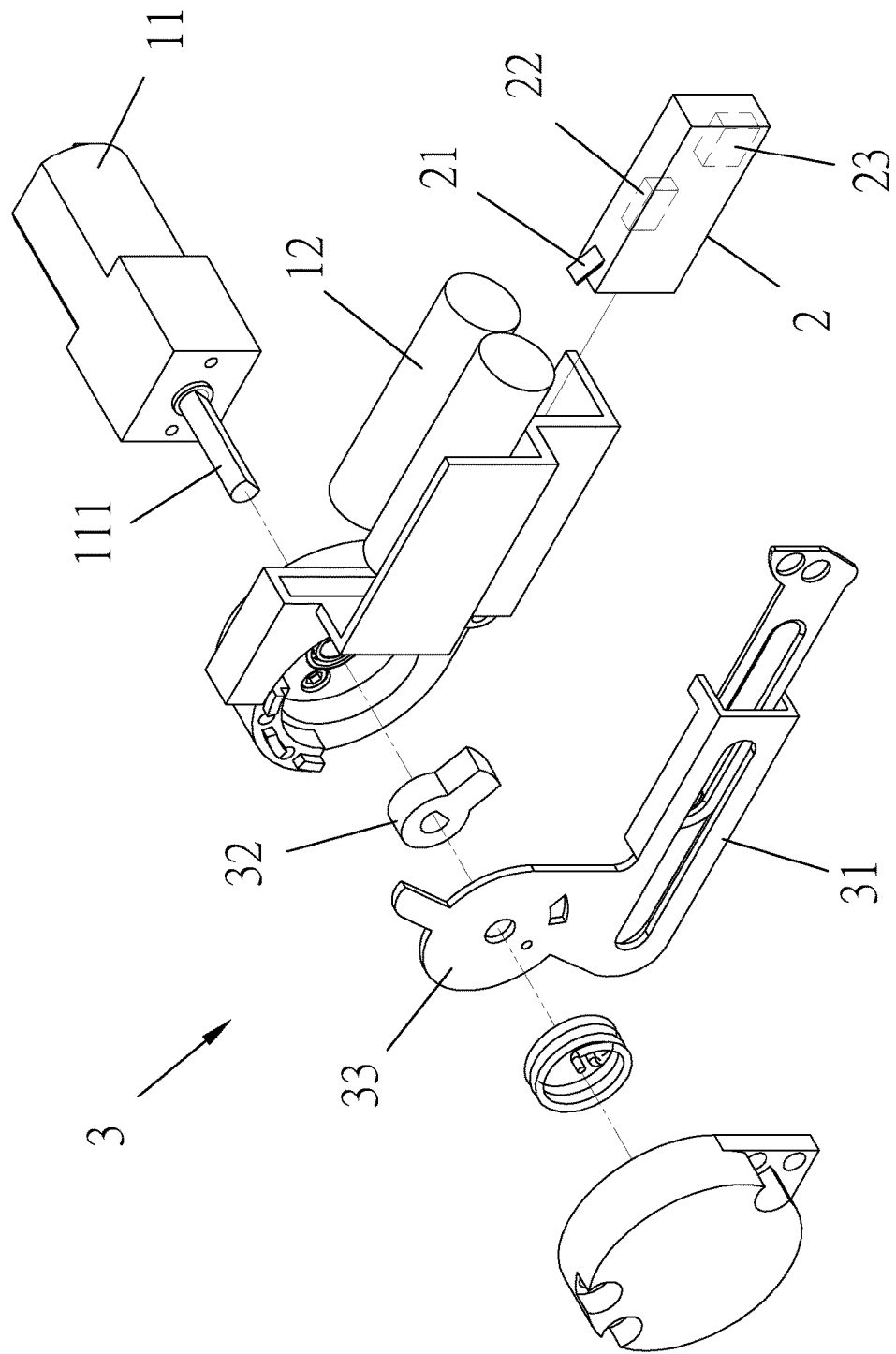
FIG. 2 is an exploded view of the present invention.
Figure 3:
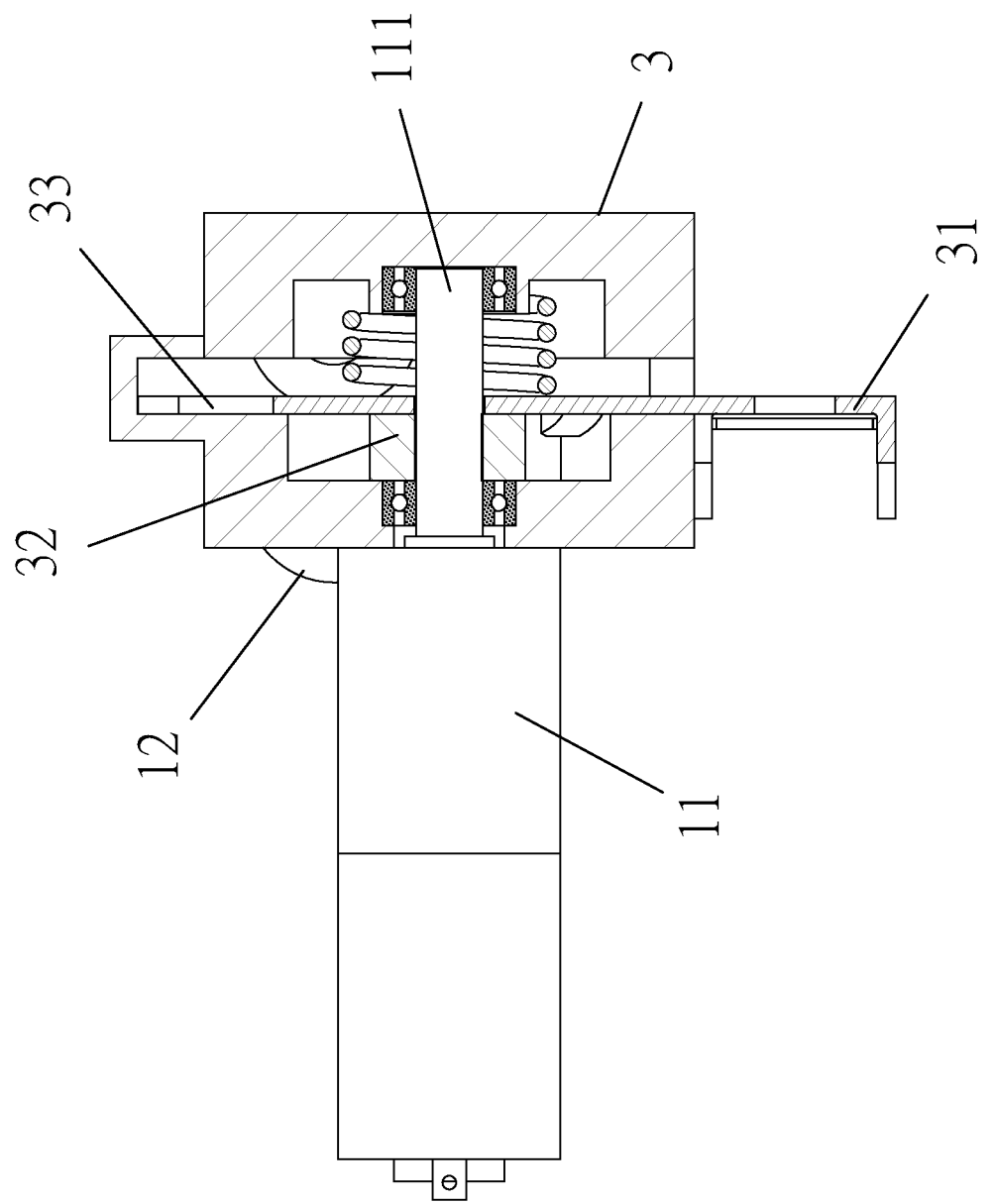
FIG. 3 is a cross-sectional view of the present invention.

Referring to FIGS. 1-3, which are respectively a perspective view, an exploded view, and a cross-sectional view of the present invention, as shown in the drawings, the present invention generally comprises a driver unit 1. The driver unit 1 comprises, in the interior thereof, a driving element 11 and a power supply 12. The driving element 11 has an end to which a first driving body 111 is mounted. A control element 2 is arranged at a location on one side, one end, or one surface of the driver unit 1. The control element 2 has a surface on which a switch 21, a sensing element 22 and a determination element 23 are arranged. The power supply 12 is electrically connected to the driving element 11 and the control element 2. A lifting unit 3 is mounted at a location on one side, one end, or one surface of the driver unit 1. The lifting unit 3 has an end on which a support element 31 is arranged. The lifting unit 3 comprises a second driving body 32 arranged in the interior thereof. The support element 31 is coupled to the second driving body 32. The first driving body 111 and the second driving body 32 mate each other in order to drive the support element 31. The lifting unit 3 has a periphery on which an activator 33 is arranged.

Figure 4:
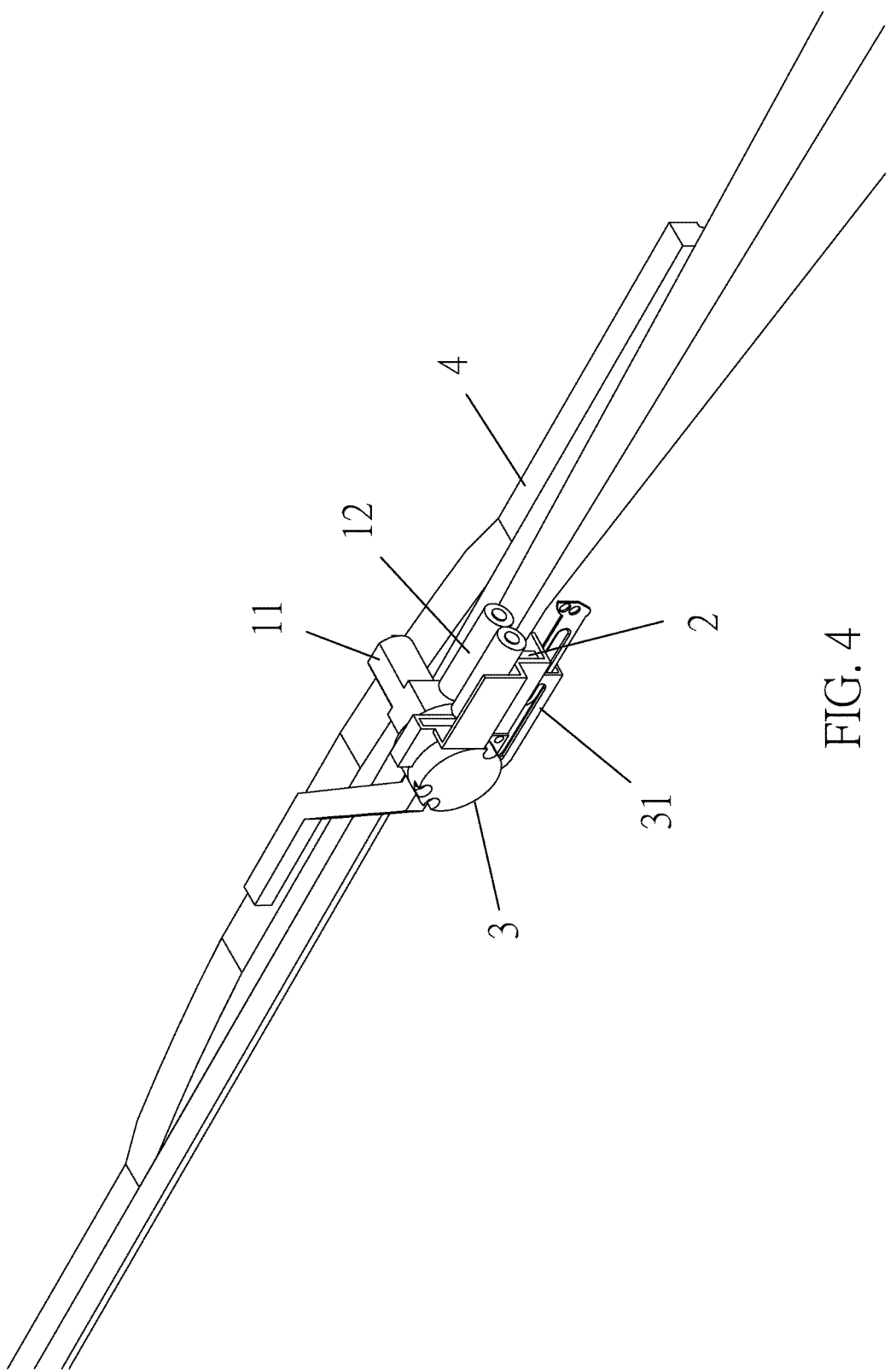
FIG. 4 is a schematic view illustrating a condition of use of the present invention.
Figure 5:
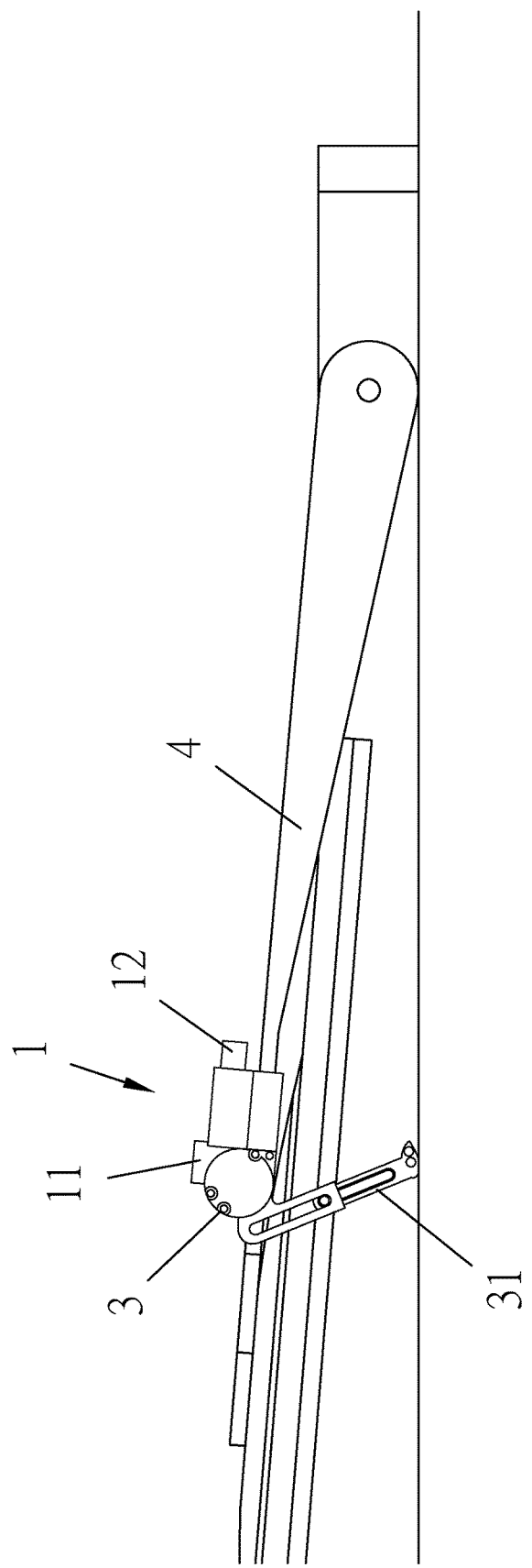
FIG. 5 is a schematic view illustrating a lifted state of the present invention.
Figure 6:
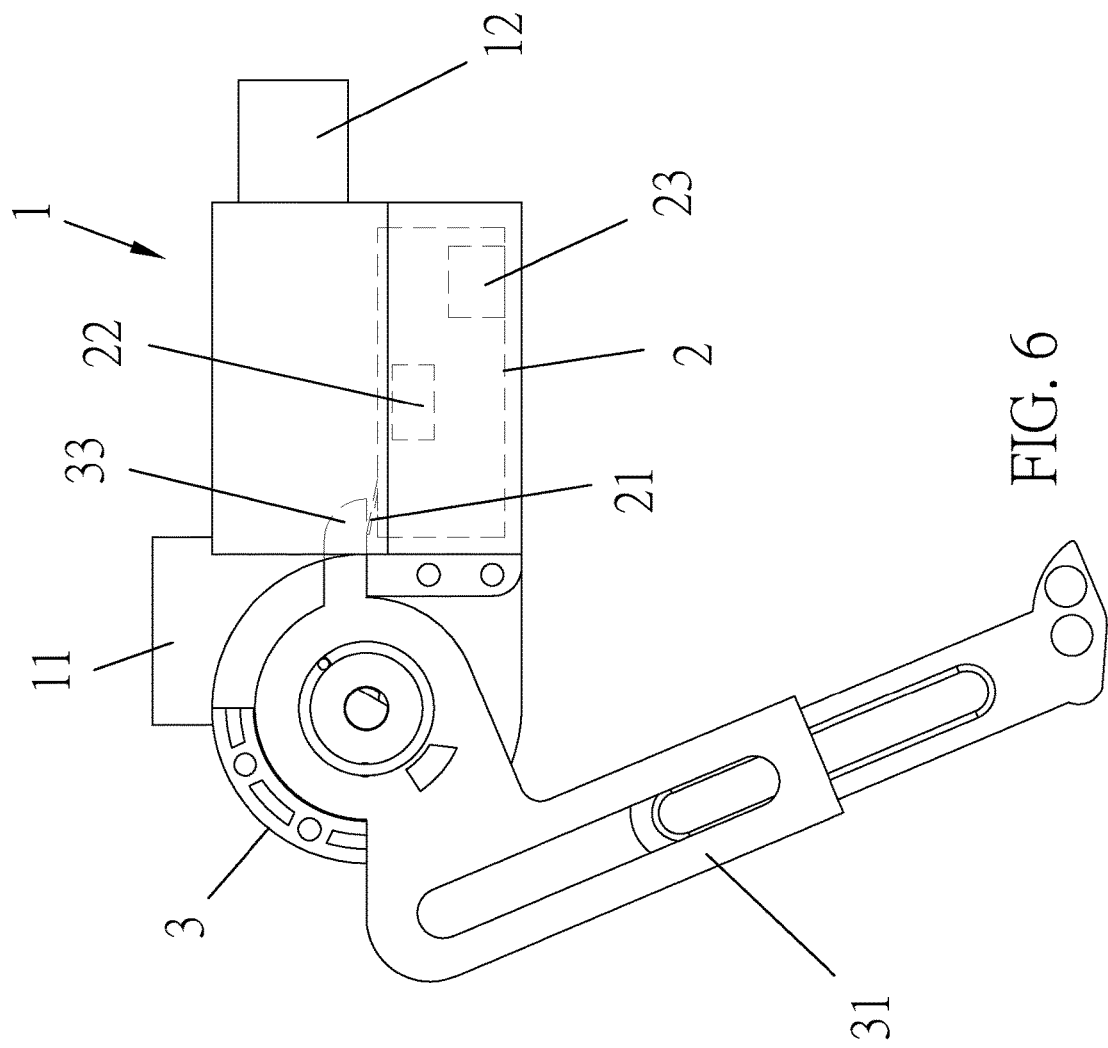
FIG. 6 is an enlarged view of a portion of the present invention in the lifted state.

Referring to FIGS. 4-6, which is a schematic view illustrating a condition of use of the present invention, a schematic view illustrating a lifted state of the present invention, and an enlarged view of a portion of the present invention in the lifted state, as shown in the drawings, the driver unit 1 is connected, at one side, to a windshield wiper 4, such that when the windshield wiper 4 stops operation, the driver unit 1 determines, by means of the control element 2, if a lifting operation of the windshield wiper 4 is need to be carried out, wherein the determination element 23 makes a determination according to conditions of (1) a lapse of time that the windshield wiper 4 is not wiping exceeding 20 seconds and (2) the windshield wiper 4 returning to a home position and the sensing element 22 detects if temperature exceeds than 20° C.-23° C. When all the above conditions are met, the driver unit 1 drives the driving element 11 to operate so as to cause the first driving body 111 to rotate. Since the first driving body 111 and the second driving body 32 are in mating engagement with each other, the second driving body 32 is caused to rotate. When the second driving body 32 rotates, the second driving body 32 drives the support element 31 to undergo a spring-up movement. When the support element 31 springs up, the activator 33 arranged on the periphery of the lifting unit 3 presses down the switch 21 of the control element 2 to cause the driver unit 1 to make a power cutting operation so as to effectively reduce the amount of electrical power consumed and complete an operation of lifting up the windshield wiper 4.

Figure 7:
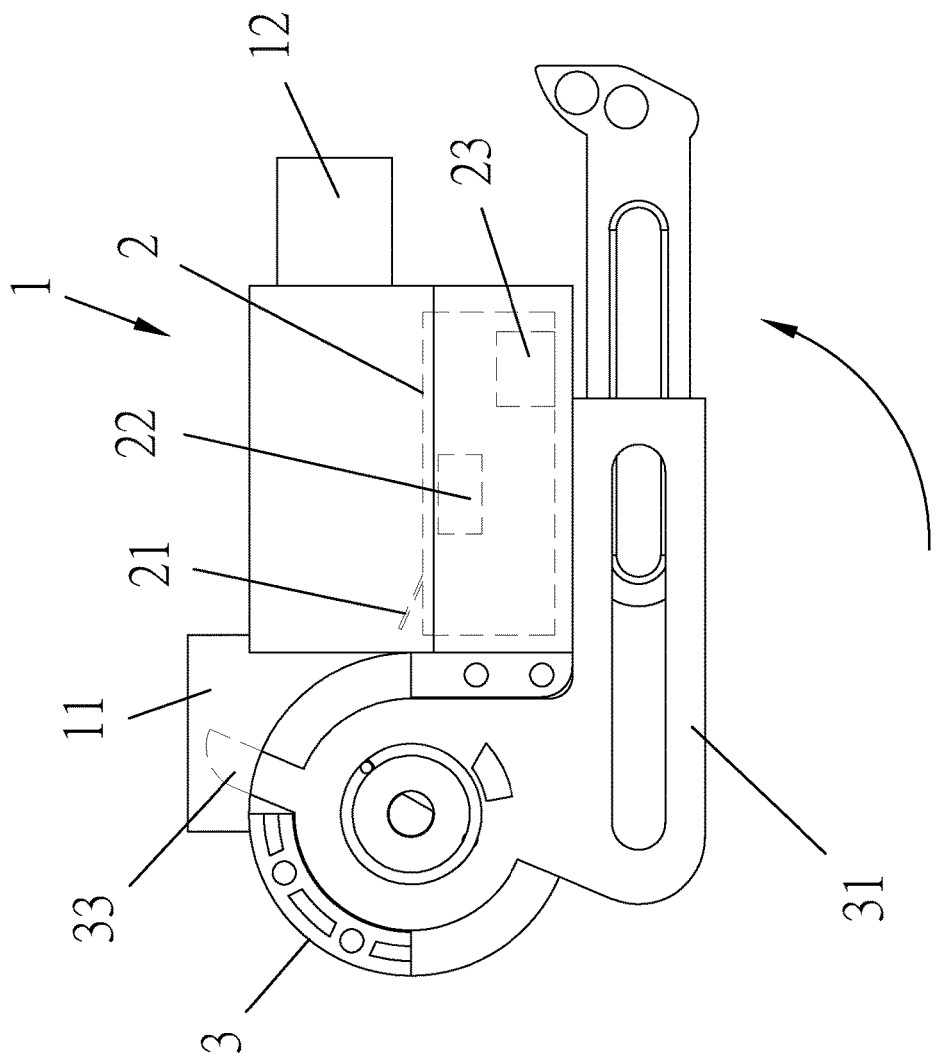
FIG. 7 is a schematic view illustrating a spring-back state of the present invention.

Referring to FIG. 7, which illustrates a collapsed state of the present invention, as shown in the drawing, when the windshield wiper 4 is activated, a reciprocal wiping movement of the windshield wiper 4 provides a sufficient force to cause the support element 31 to spring back. When the support element 31 springs back, the activator 33 disengages from the switch 21 so as to allow the driver unit 1 to make a power conducting operation. Thereafter, subsequently, the control element 2 conducts an operation of determining if to carry out a lifting operation. In this way, such cyclical repeating may provide advantages of easy use, saving power, automatic lifting of the windshield wiper, preventing a windshield wiper blade from hardening, and preventing the windshield wiper blade from deforming.

Figure 8:
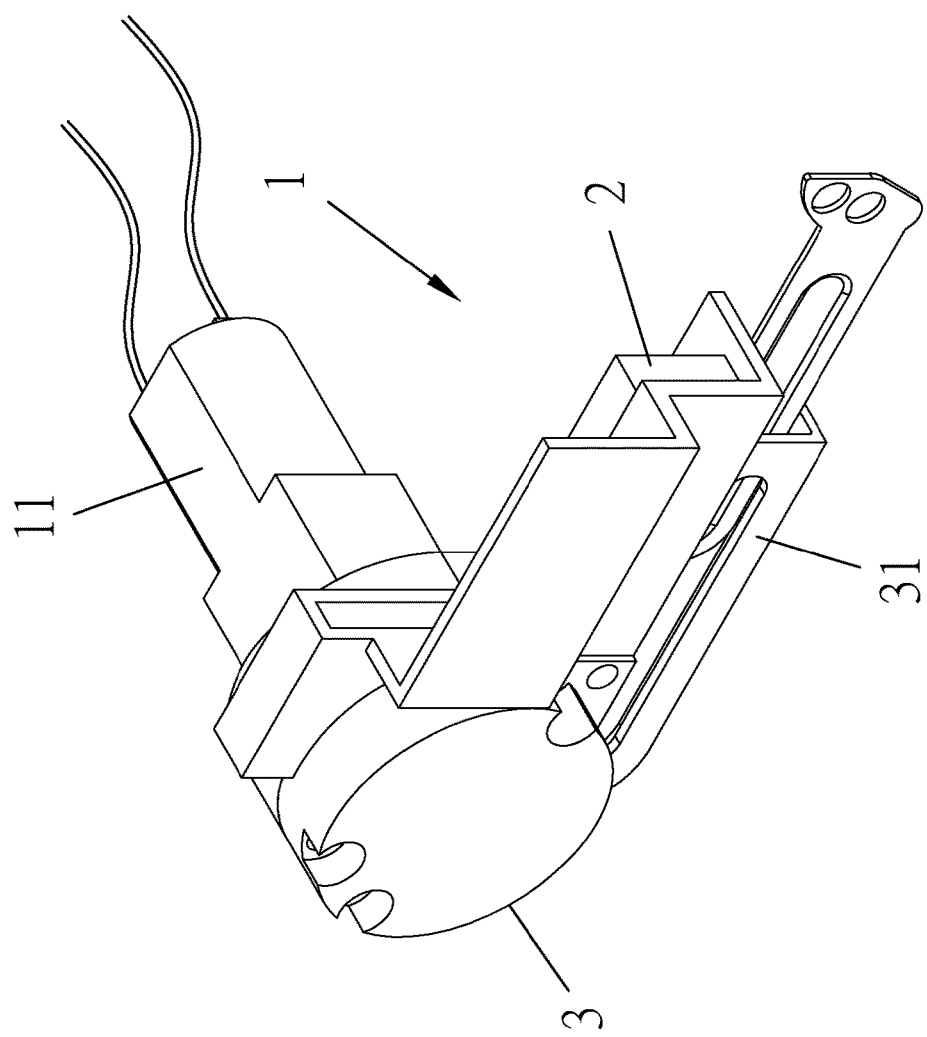
FIG. 8 is a schematic view illustrating an example of a power supply according to the present invention.

Referring to FIG. 8, which is a schematic view illustrating an example of the power supply according to the present invention, as shown in the drawing, the power supply 12 may receive electrical power from other units that are capable supplying electrical power for supplying the electrical power to the driver unit 1. Further, it is common in a garage to connect an end of a cable to a battery of an automobile or a motorcycle and an opposite end of the cable connected to the driving element 11 to supply electrical power to the driver unit 1 so as to achieve the same effect of the present invention as discussed above.

In summary, the present invention provides an automatic integrated automobile windshield wiper lifting device, which can effectively prevent a windshield wiper blade from getting hardened or deformed thereby extending the service life of the windshield wiper 4 by eight to ten times and effectively eliminating all sorts of drawbacks of the conventional lifting devices.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An automatic integrated automobile windshield wiper lifting device, comprising:
    a driver unit, which is adapted to connect to an automobile windshield wiper and comprises, in an interior thereof, a driving element that has an end to which a first driving body is mounted, the driver unit comprising a control element arranged at a predetermined location thereof, the driving element being electrically connected to the control element; and
    a lifting unit, which is mounted to a predetermined location of the driver unit and has an end at which a support element is arranged, the lifting unit comprising a second driving body arranged therein, the support element being coupled to the second driving body, the first driving body and the second driving body being in mating engagement with each other to drive the support element, the lifting unit being provided, at a predetermined location, with an activator;
    wherein the first driving body is arranged to extend in an axial direction and is caused by an operation of the driving element to rotate about an axis of the first driving body extending in the axial direction;
    wherein the second driving body that is in mating engagement with the first driving body is rotatable in unison with the first driving body about the axis of the first driving body between a first angular position, where the support element that is coupled to the second driving body is set at a location to lift up the windshield wiper, and a second angular position, where the support element is moved away from the location where the windshield wiper is lifted up and the activator that is connected to the support element is moved to a position to cause the control element to shut down the operation of the driving element and thus terminate the rotations of the first and second driving bodies.

2. The automatic integrated automobile windshield wiper lifting device according to claim 1, wherein the control element is arranged at a location on one side, one end, or one surface of the driver unit.

3. The automatic integrated automobile windshield wiper lifting device according to claim 2, wherein the control element has a surface on which a switch, a sensing element, and a determination element are arranged.

4. The automatic integrated automobile windshield wiper lifting device according to claim 1, wherein the lifting unit is mounted at a location on one side, one end, or one surface of the driver unit.

5. The automatic integrated automobile windshield wiper lifting device according to claim 1, wherein the lifting unit has a periphery on which the activator is arranged.

6. An automatic integrated automobile windshield wiper lifting device, comprising:
a driver unit, which is adapted to connect to an automobile windshield wiper and comprises, in an interior thereof, a driving element and a power supply, the driving element having an end to which a first driving body is mounted, the driver unit comprising a control element arranged at a predetermined location thereof, the power supply being electrically connected to the driving element and the control element to be controlled by the control element to selectively supply electrical power to the driving element to cause an operation of the driving element; and
a lifting unit, which is mounted to a predetermined location of the driver unit and has an end at which a support element is arranged, the lifting unit comprising a second driving body arranged therein, the support element being coupled to the second driving body, the first driving body and the second driving body being in mating engagement with each other to drive the support element, the lifting unit being provided, at a predetermined location, with an activator;
wherein the first driving body is arranged to extend in an axial direction and is caused by the operation the driving element to rotate about an axis of the first driving body extending in the axial direction;
wherein the second driving body that is in mating engagement with the first driving body is rotatable in unison with the first driving body about the axis of the first driving body between a first angular position, where the support element that is coupled to the second driving body is set at a location to lift up the windshield wiper, and a second angular position, where the support element is moved away from the location where the windshield wiper is lifted up and the activator that is connected to the support element is moved to a position to cause the control element to cut off the supply of the electrical power from the power supply to the driving element so as to shut down the operation of the driving element and thus terminate the rotations of the first and second driving bodies.

7. The automatic integrated automobile windshield wiper lifting device according to claim 6, wherein the control element is arranged at a location on one side, one end, or one surface of the driver unit.

8. The automatic integrated automobile windshield wiper lifting device according to claim 7, wherein the lifting unit is mounted at a location on one side, one end, or one surface of the driver unit.

9. The automatic integrated automobile windshield wiper lifting device according to claim 6, wherein the control element has a surface on which a switch, a sensing element, and a determination element are arranged.

10. The automatic integrated automobile windshield wiper lifting device according to claim 6, wherein the lifting unit has a periphery on which the activator is arranged.

* * * * *